2,868,734

LIQUID DEFOAMING COMPOSITION

Arthur De Castro, Irvington, Charles Herbert Lighthipe, Bloomfield, and Thomas Francis Groll, Jr., Elizabeth, N. J., assignors to Nopco Chemical Company, Harrison, N. J., a corporation of New Jersey No Drawing. Application February 12, 1953
Serial No. 336,648

10 Claims. (Cl. 252—358)

This invention relates, in general, to anti-foaming and/or defoaming compositions. More particularly, it relates to new and improved liquid anti-foaming and/or defoaming compositions.

The tendency of various substances to foam and froth when heated, agitated, etc., and the technical problem created thereby in very many industrial operations, is well known. Thus, for example, foaming occurs in the manufacture of pulp and paper, in the manufacture and use of adhesive materials, and in the manufacture of yeast. Moreover, foaming occurs in many fermentation processes, other than the manufacture of yeast, as well as in processes in which evaporation steps are employed, as for example, in the production of condensed or evaporated milk. For obvious reasons, foaming in these processes, and in others not herein mentioned, is highly undesirable. This problem has, for many years, been subjected to continual investigation, the object thereof being the development of new and improved defoaming agents. Primarily, the suitability of any defoaming agent is measured by its ability to prevent, or at least deter, the formation of foam. However, the efficacy of a composition for use as a defoaming agent in very many industrial processes depends also upon the stability of the product itself, the stability of aqueous emulsions of said product or upon a combination of both of these. In the past, many compositions have been disclosed as defoaming agents. The large majority of the prior art products have not been wholly satisfactory for use in industrial processes due to their instability or to the instability of the aqueous emulsions produced therefrom. The products of the present invention are adapted to fulfill the need for superior defoaming compositions of enhanced stability characteristics. Moreover, the present products are particularly well suited for use in any or all industrial processes in which the formation of foam presents a problem.

It is the object of this invention to provide new and improved anti-foaming and defoaming compositions.

More particularly, it is the object of this invention to provide liquid anti-foaming and defoaming compositions whose properties are such that they are suitable for use in all processes in which the formation of excessive froth or foam is undesirable.

Other objects of the invention will in part be obvious and will in part appear hereinafter.

It has been discovered that the compositions of the present invention, which comprise a blend of (1) an aliphatic hydrocarbon or mixtures thereof, (2) a mixture of selected dihydric alcohol esters of higher fatty acids and (3) a carboxylic acid type composition or mixtures thereof, are an improved variety of defoaming agents which are, in part, characterized by their liquid form, their inherent stability, their emulsifiability and, in part, by the stability of their aqueous emulsions.

The novel compositions of this invention contain an aliphatic hydrocarbon, or mixtures thereof, as one essential component. The aliphatic hydrocarbons suitable for use in the practice of this invention are liquid in form at room temperature and atmospheric pressure and have a minimum boiling point of at least about 150° F. Thus, aliphatic hydrocarbons such as hexane, heptane, octane, paraffin oil, mineral seal oil, white mineral oil, kerosene, naphtha, etc., are examples of some of the compositions which have been found to be fully suited for use. If desired mixtures of any two or more of these or other similar hydrocarbons can be employed. In the practice of this invention, the liquid aliphatic hydrocarbon component of the composition comprises from about 40% to about 80% by weight of the novel defoaming compositions. However, the preferred products of this invention ordinarily contain from about 55% to about 65% by weight of the aliphatic hydrocarbon component.

One of the most important features of this invention is the use of a combination of selected esters of ethylene glycol and polyethylene glycol. As used throughout the specification and in the claims, the expression polyethylene glycol is used to designate a polymerized ethylene glycol containing more than one ethylene group in its chain. In the practice of this invention the ethylene glycol and polyethylene glycol esters employed are monoesters or diesters of higher molecular weight monocarboxylic acids. For the purposes of this invention the glycol esters are classified into two groups according to the molecular weight of the glycol from which they are prepared. The first group consists of esters prepared from ethylene glycol or from low molecular weight polyethylene glycols while the second group consists of esters prepared from high molecular weight polyethylene glycols. In each and every embodiment of this invention, at least one ester from each of these two groups is present.

Thus, in the products of the present invention, an ester prepared either from ethylene glycol, or from a polyethylene glycol having a molecular weight which is less than about 200, and a fatty acid having a carbon chain length of from about 12 to about 22 carbon atoms is always present. The fatty acids employed in the preparation of these esters are straight chain or branched chain aliphatic carboxylic acids which are saturated, unsaturated or hydroxylated. Thus, compounds such as ethylene glycol monolaurate, ethylene glycol monostearate, ethylene glycol distearate, diethylene glycol monolaurate, diethylene glycol monostearate, diethylene glycol monoricinoleate, diethylene glycol monooleate, diethylene glycol dilaurate, diethylene glycol distearate, triethylene glycol monostearate, triethylene glycol monooleate, triethylene glycol distearate, etc., can be employed. In the preferred embodiment of the invention, monoesters of diethylene glycol are used. These esters are employed in the practice of this invention in quantities ranging from about 10% to about 30% by weight of the final compositions. Preferably, however, these fatty acid esters comprise from about 15% to about 25% by weight of the final product.

The polyethylene glycol ester used in the practice of this invention in combination with the fatty acid ester of ethylene glycol or of the low molecular weight polyethylene glycol is a fatty acid ester of a relatively high molecular weight polyethylene glycol. The esters thus contemplated for use, are those which have been prepared from a polyethylene glycol having a molecular weight which is greater than about 400 and a fatty acid having a carbon chain length of from about 12 to about 22 carbon atoms. The fatty acids used in preparing these esters are straight chain or branched chain aliphatic carboxylic acids which are saturated, unsaturated or hydroxylated. As examples of some of the esters which are contemplated for use, the monoesters or diesters of polyethylene glycol (molecular weight of 400) and lauric, stearic, or oleic acid, and the monoesters and diesters of polyethylene glycol (molecular weight of 600) and lauric, stearic or oleic acid, etc., can be mentioned. In the preferred embodiment of the invention, fatty acid monoesters of polyethylene glycols having a molecular weight of from 400 to about 1000 are used. The ester of the relatively high molecular weight polyethylene glycol ordinarily comprises from about 5% to about 20% by weight of the final product. However, in the preferred embodiment of the invention, the novel defoaming compositions contain from about 8% to about 15% of this ester.

The final ingredient which is used in preparing the novel defoaming agents of this invention is a liquid composition which is characterized by the presence therein of a carboxylic acid group or carboxylic acid groups. As examples of the compositions which are included within the purview of the generic expression thus used, fatty acids which are liquid at room temperature and which have a carbon chain length of from about 6 to 22 carbon atoms and mixtures thereof, rosin acids and mixtures of these are mentioned. As used throughout the specification and in the claims, the expression liquid fatty acids includes mixtures of liquid fatty acids with fatty acids that are solid at normal room temperatures and which have a carbon chain length of from about 6 to 22 carbon atoms provided that the ratio of liquid material to solid material is such that the final mixture thereof is itself liquid at ordinary room temperatures. The liquid fatty acids contemplated for use herein are chiefly the unsaturated fatty acids. However, the lower molecular weight liquid saturated fatty acids as well as liquid mixtures of the higher molecular weight saturated fatty acids with liquid fatty acids are also fully operative. Thus, for example, the use of acids, such as caproic, caprylic, oleic, linoleic, the fatty acids of coconut oil and mixtures thereof, etc. is encompassed by this invention. Moreover, the use of acids such as capric, lauric, myristic, palmitic, and stearic acids, etc. in admixture with any suitable liquid carboxylic acid type composition, in such proportions that the mixtures thus produced are liquids, are within the scope of the invention. It has been found, however, that tall oil, which is essentially a mixture of rosin acids and nonconjugated unsaturated fatty acids is particularly well suited for use and, therefore, in the preferred embodiment of the invention tall oil is used. In the practice of this invention, the liquid carboxylic acid type composition comprises from about 1% to about 25% by weight of the liquid defoamer. However, in the preferred embodiment of the invention, the carboxylic acid composition comprises from about 3% to about 10% by weight of the defoaming agent.

A distinct advantage of this invention is the ease with which the novel compositions can be prepared. The sequence in which the various components are admixed does not to any extent affect the physical or chemical characteristics of the final product. Thus, if desired, the esters could be initially added to the liquid hydrocarbon and the carboxylic acid type composition subsequently blended therewith. In the alternative, the carboxylic acid type compound, if desired, could be initially admixed with either one of the esters to be used, subsequently admixed with the other ester and the entire mixture blended with the liquid hydrocarbon. Simiarly, the carboxylic acid type compound could be admixed with either one of the esters, subsequently blended with the hydrocarbon component and the other ester added thereto. However, regardless of the sequence of steps employed in blending the ingredients, the actual blending of the components is facilitated if carried out at an elevated temperature, for example, at a temperature of from about 50° C. to about 100 C. In most instances the heating of the materials to a temperature of about 75° C. will effectively produce the desired blend. In preparing the compositions of this invention, the mixture of components should be stirred or otherwise agitated to insure homogeneity in the final product. The heat and agitation should be applied continuously until the solution which ensues is relatively quite clear. Thereafter, the liquid blend is allowed to cool. On cooling, the blend retains its liquid form and, after standing at room temperatures for extended periods of time, no perceptible change, either in the physical characteristics or the chemical properties of the compositions, will be observed. Although, in a majority of instances the liquid products of this invention are brilliantly clear at the blending temperature and will remain so when cooled to room temperature, certain of the compositions produced in accordance with this invention, namely, certain of the compositions into which tall oil has been incorporated, may be hazy or even cloudy liquids. However, such haziness or cloudiness should not be interpreted as indicating either that the product itself is unstable or that the emulsifiability or defoaming ability of the product will be unsatisfactory. All of the tall oil-containing products encompassed by the present disclosure which have been blended in the manner heretofore set forth whether they are clear or cloudy, are inherently stable, are readily emulsified and are defoaming agents of superior ability. The cause of haziness or cloudiness in certain of the tall oil-containing products of this invention has not been definitely ascertained. In all probability this condition results from the suspension in the liquid product of resinous matter originally contained in the tall oil, collodial in nature, which can be incorporated entirely into the solution, if at all, only with excessive and prolonged heating. However, since these particles do not, to any extent, exert a deleterious effect upon the products themselves nor lessen their usefulness as defoaming agents and since these particles are readily removed by filtration to give brilliantly clear solutions, the application of excessive heat in an attempt to incorporate these particles into the solution is deemed to be neither practical nor advisable. In the preferred embodiment of the invention, to accomplish uniformity, hazy or cloudy liquid products are filtered.

Due to the diverse nature of the processes in which the present products function as anti-foaming and defoaming agents, it is virtually impossible to set forth proportions which will, in general, adequately embrace the specific quantities of the present products required to efficaciously produce the result desired in each and every process. The quantity needed will, for the most part, depend upon various factors in the particular process in which the product is to be used. Hence, for any one process, the most efficient and effective amount can be readily determined by anyone skilled in the particular art in which it is to be used. However, regardless of the nature of the specific process in which the defoaming agents of this invention are to be used, they will at all times prove themselves to be superior to other known defoaming agents and highly satisfactory in every regard.

The advantages which accrue from the present products, and from the use thereof as defoaming agents are many and varied. The products are not only superior and efficient antifoaming agents and defoaming agents but they also provide increased economy advantageous both to the manufacturer and to the consumer. Moreover, the properties of the present products are such that certain technical improvements in the processes which employ defoaming agents are now possible. Thus, in the first place, the present products are all liquid in form and are more easily handled than a vast majority of prior art products which are pasty in consistency. Moreover, whereas the majority of the ordinary paste defoamers contained large percentages of water, the products of the present invention are completely water-free. Furthermore, although the present products, prior to the use thereof, can be readily, and are ordinarily emulsified in water, the water-free liquid products of this invention can be added in certain instances, per se to the foaming solution to provide completely satisfactory anti-foaming and defoaming action. This property itself, will immediately suggest processes to those skilled in the art wherein the present products will find ready application. However, the present products are also highly satisfactory for use in those processes in which it is desirable to add the antifoaming agent or defoaming agent in the form of an aqueous emulsion, since they are readily emulsified with a minimum amount of agitation. Moreover, particularly advantageous is the fact that the emulsions thus produced are relatively quite stable. Thus, with the products of the present invention, the emulsification of the defoaming agent immediately prior to the use thereof, is not at all necessary, but instead aqueous emulsions of the products of the present invention can be prepared many hours in advance of their anticipated use and when needed will be eminently well suited for use.

As will readily appear from a consideration of the examples presented hereinafter, the products of the present invention are superior liquid antifoaming and/or defoaming agents. Moreover, aqueous emulsions of the products are unexcelled by any of the prior art products in their stability. This is true, notwithstanding the fact that the component ingredients of these products are not, in and of themselves, new or novel in the art. However, the superiority of the present compositions cannot be attributed merely to the individual effect exerted by each of the components of the product. Rather, the excellent results obtained with these products can only be attributed to an effect obtained by blending the particular components in the proportions indicated.

For a fuller understanding of the nature and objects of this invention, reference should be had to the following examples which are given merely as further illustrations of the invention and are not to be construed in a limiting sense. All parts are given by weight.

*Example I*

In this example, 5.1 parts of refined tall oil and 11.9 parts of polyethylene glycol (600) monooleate were admixed at room temperature and added to 63 parts of paraffin oil. To this, 20.0 parts of diethylene glycol monooleate were added. The mixture was then heated to a temperature of about 75° C. and thoroughly stirred until a clear solution was obtained. The product was thereafter allowed to cool to room temperature. The product on cooling was clear and fluid and after standing at this temperature, the product did not undergo any change in its physical properties. A 10% aqueous emulsion of this product was stable on standing overnight at room temperature.

*Example II*

In this example, 10.2 parts of refined tall oil and 6.8 parts of polyethylene glycol (400) monoester of coconut oil fatty acids were initially admixed and added to 63 parts of 28° Bé. paraffin oil. To this mixture, 20 parts of diethylene glycol monooleate was added. The ensuing mixture was heated to a temperature of about 75° C. with thorough agitation. The heating and mixing were continued until the solution was relatively quite clear. At this point, the product was allowed to cool to room temperature, at which temperature the product became somewhat cloudy, but remained fluid. On standing at room temperature the product remained unchanged in its physical characteristics. A 10% aqueous emulsion of this product was relatively stable on standing overnight at room temperature.

*Example III*

The products of Examples I and II were evaluated by testing their defoaming ability in synthetic white water (pH 5.0). The synthetic white water employed in these tests had the same composition as that of the white water which is found in the average paper mill. The white water was prepared by thoroughly admixing 99.111 parts of water, 0.089 part of rosin size (Hercules XXX brand of sodium rosinate, Hercules Powder Company, Wilmington, Delaware) 0.005 part of anhydrous calcium chloride, 0.493 part of sodium silicate, 0.277 part of alum and 0.025 part of a preservative. In preparing the white water, the amount of alum used is varied to adjust the pH of the solution to 5.0. The defoaming effectiveness of the products of Examples I and II was tested in a tall form beaker of 1000 cc. capacity, the beaker having a line marked on the side thereof which was about 4½ inches from the bottom of the beaker. On the side of the beaker, at the bottom thereof, there was a side arm outlet connected, by means of a rubber hose, to a centrifugal pump. The pump was employed to continuously cycle the white water from the beaker thru the pump and back into the beaker at such a speed that the solution remaining in the beaker was agitated by the reentering solution to such an extent that the formation of foam was induced. The circulating solution reentered the beaker and struck the surface of solution at an angle of 90° and it entered from a point about 3 inches above the surface of the solution.

The test was carried out on three separate solutions. The first solution employed was 500 cc. of pH 5.0 white water. This solution did not contain a defoaming agent of any kind. The second solution employed was 500 cc. of pH 5.0 white water to which 3 cc. of a 0.5% emulsion of the product of Example I had been added. The third solution employed was 500 cc. of pH 5.0 white water to which 3 cc. of a 0.5% emulsion of the product of Example II had been added. The first solution to be tested, the blank, was placed in the 1000 cc. capacity tall form beaker described heretofore. The level of this solution in the beaker was about 1¼ inches below the 4½ inch mark previously placed on the beaker. The side arm outlet was connected to the circulating pump by means of a section rubber hose. The pump was started and foam immediately developed. The length of time that elapsed between starting the pump and the rise of the head of foam to the 4½ inch mark on the beaker was recorded. In the case of the defoamer-free white water the head of foam reached the 4½ inch mark on the beaker after only 8 seconds had elapsed.

The second solution to be tested was the white water containing the product of Example I. This solution was prepared in the tall form beaker by adding 3 cc. of the 0.5% emulsion to 500 cc. of white water. The level of this solution in the beaker was also about 1¼ inches below the 4½ inch mark placed on the side of the beaker. The circulating pump was started and the length of time that elapsed between the time that the pump was started and the time that the foam which developed reached the 4½ inch mark was recorded. It was found that the foam of the white water solution containing the product of Example I reached the 4½ inch mark only after the expiration of about 70 seconds.

The third solution to be tested was prepared also in the tall form beaker by adding to 500 cc. of the pH 5.0 white water, 3 cc. of a 0.5% emulsion of the product of Example II. In the beaker, the top of this solution was also at a level which was about 1¼ inches below the 4½ inch mark. As in the previous tests the circulating pump was started and the time in which the head of foam developed thereby reached the 4½ inch mark on the beaker was recorded. It was found that the head of foam developed by the pH 5.0 white water containing the product of Example II reached the 4½ inch mark on the beaker only after 90 seconds had elapsed.

Having described our invention, what we claim as new and desire to secure by Letters Patent is:

1. A liquid defoaming agent comprising from about 40% to about 80% by weight of a liquid aliphatic hydrocarbon having a boiling point of at least 150° F., from about 10% to about 30% by weight of an ester of a dihydric alcohol selected from the group consisting of ethylene glycol and polyethylene glycols having a molecular weight of less than about 200 and an aliphatic carboxylic acid having a carbon chain length of from 12 to 22 carbon atoms, from about 5% to about 20% by weight of an ester of a polyethylene glycol having a molecular weight which is greater than about 400 and an aliphatic carboxylic acid having a carbon chain length of from about 12 to 22 carbon atoms, and from about 1% to about 25% by weight of a liquid carboxylic acid composition selected from the group consisting of tall oil, liquid aliphatic carboxylic acids having a carbon chain length of from about 6 to 22 carbon atoms and mixtures thereof, and liquid mixtures of said liquid aliphatic carboxylic acids with solid carboxylic acids having a carbon chain length of from 6 to 22 carbon atoms.

2. A liquid defoaming agent comprising from 40% to about 80% by weight of a mineral oil having a boiling point of at least 150° F., from about 10% to about 30% by weight of an ester of a dihydric alcohol selected from the group consisting of ethylene glycol and polyethylene glycols having a molecular weight of less than about 200 and an aliphatic carboxylic acid having a carbon chain length of from about 12 to 22 carbon atoms, from about 5% to about 20% by weight of an ester of a polyethylene glycol having a molecular weight which is greater than about 400 and an aliphatic carboxylic acid having a carbon chain length of from about 12 to 22 carbon atoms, and from about 1% to about 25% by weight of a liquid carboxylic acid composition selected from the group consisting of tall oil, liquid aliphatic carboxylic acids having a carbon chain length of from about 6 to 22 carbon atoms and mixtures thereof, and liquid mixtures of said liquid aliphatic carboxylic acids with solid carboxylic acids having a carbon chain length of from 6 to 22 carbon atoms.

3. A liquid defoaming agent comprising from about 55% to about 65% by weight of a mineral oil having a boiling point of at least 150° F., from about 15% to about 25% by weight of an ester of a dihydric alcohol selected from the group consisting of ethylene glycol and a polyethylene glycol having a molecular weight of less than about 200 and an aliphatic carboxylic acid having a carbon chain length of from about 12 to 22 carbon atoms, from about 8% to about 15% by weight of an ester of a polyethylene glycol having a molecular weight which is greater than about 400 and an aliphatic carboxylic acid having a carbon chain length of from about 12 to 22 carbon atoms, and from about 3% to about 10% by weight of a liquid carboxylic acid composition selected from the group consisting of tall oil, liquid aliphatic carboxylic acids having a carbon chain length of from about 6 to 22 carbon atoms and mixtures thereof, and liquid mixtures of said liquid aliphatic carboxylic acids with solid carboxylic acids having a carbon chain length of from 6 to 22 carbon atoms.

4. A liquid defoaming agent comprising from about 55% to about 65% by weight of a mineral oil having a boiling point of at least 150° F., from about 15% to about 25% by weight of an ester of diethylene glycol and an aliphatic carboxylic acid having a carbon chain length of from about 12 to 22 carbon atoms, from about 8% to about 15% by weight of an ester of a polyethylene glycol having a molecular weight which is greater than about 400 and an aliphatic carboxylic acid having a carbon chain length of from about 12 to 22 carbon atoms, and from about 3% to about 10% by weight of a liquid carboxylic acid composition selected from the group consisting of tall oil, liquid aliphatic carboxylic acids having a carbon chain length of from about 6 to 22 carbon atoms and mixtures thereof, and liquid mixtures of said aliphatic carboxylic acids with solid carboxylic acids having a carbon chain length of from 6 to 22 carbon atom.

5. A liquid defoaming agent comprising from about 55% to about 65% by weight of a mineral oil having a boiling point of at least 150° F., from about 15% to about 25% by weight of an ester of diethylene glycol and an aliphatic carboxylic acid having a carbon chain length of from 12 to 22 carbon atoms, from about 8% to about 15% by weight of an ester of a polyethylene glycol having a molecular weight of from about 400 to about 1000 and an aliphatic carboxylic acid having a carbon chain length of from 12 to 22 carbon atoms, and from about 3% to about 10% by weight of a liquid carboxylic acid composition selected from the group consisting of tall oil, liquid aliphatic carboxylic acids having a carbon chain length of from about 6 to 22 carbon atoms and mixtures thereof, and liquid mixtures of said liquid aliphatic carboxylic acids with solid carboxylic acids having a carbon chain length of from about 6 to 22 carbon atoms.

6. A liquid defoaming agent comprising from about 55% to about 65% by weight of a mineral oil having a boiling point of at least 150° F., from about 15% to about 25% by weight of a monoester of diethylene glycol and an aliphatic carboxylic acid having a carbon chain length of from 12 to 22 carbon atoms, from about 8% to about 15% by weight of a monoester of a polyethylene glycol having a molecular weight of from about 400 to about 1000 and an aliphatic carboxylic acid having a carbon chain length of from 12 to 22 carbon atoms and from about 3% to about 10% by weight of oleic acid.

7. A liquid defoaming agent comprising from about 55% to about 65% by weight of a mineral oil having a boiling point of at least 150° F., from about 15% to about 25% by weight of a monoester of diethylene glycol and an aliphatic carboxylic acid having a carbon chain length of from 12 to 22 carbon atoms, from about 8% to about 15% by weight of a monoester of a polyethylene glycol having a molecular weight of from about 400 to about 1000 and an aliphatic carboxylic acid having a carbon chain length of from 12 to 22 carbon atoms, and from about 3% to about 10% by weight of tall oil.

8. The composition of claim 7 in which the mineral oil is 28° Bé. paraffin oil.

9. The composition of claim 7 in which the mineral oil is white mineral oil.

10. The composition of claim 7 in which the mineral oil is mineral seal oil.

References Cited in the file of this patent

UNITED STATES PATENTS

| | | |
|---|---|---|
| 2,052,164 | Buc | Aug. 25, 1936 |
| 2,668,150 | Luvisi | Feb. 2, 1954 |
| 2,715,613 | Gibson | Aug. 16, 1955 |
| 2,715,614 | Snook | Aug. 16, 1955 |

OTHER REFERENCES

Practical Emulsions—Bennett, Chem. Pub. Co., N. Y. (1947), p. 24.

Chemical by Glyco. Glyco Products Co., N. Y. (1948), p. 16.